United States Patent
Nizami et al.

(10) Patent No.: US 11,136,134 B2
(45) Date of Patent: Oct. 5, 2021

(54) SYSTEM AND METHOD FOR OPERATING A GAS TURBINE ENGINE COUPLED TO AN AIRCRAFT PROPELLER

(71) Applicant: PRATT & WHITNEY CANADA CORP., Longueuil (CA)

(72) Inventors: Safi Nizami, Mississauga (CA); Zubair Ahmad, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 132 days.

(21) Appl. No.: 16/229,089

(22) Filed: Dec. 21, 2018

(65) Prior Publication Data
US 2020/0198794 A1 Jun. 25, 2020

(51) Int. Cl.
B64D 31/00 (2006.01)
B64C 11/30 (2006.01)
B64D 27/10 (2006.01)
F01D 21/00 (2006.01)

(52) U.S. Cl.
CPC ............ *B64D 31/00* (2013.01); *B64C 11/30* (2013.01); *B64D 27/10* (2013.01); *F01D 21/003* (2013.01); *F05D 2220/323* (2013.01); *F05D 2260/80* (2013.01); *F05D 2270/304* (2013.01); *F05D 2270/335* (2013.01)

(58) Field of Classification Search
CPC ........... B64C 11/30–308; F01D 21/003; B64D 31/00; B64D 27/10; F04D 29/05; F04D 29/053; F05D 2270/304; F05D 2270/335; F05D 2260/80
See application file for complete search history.

(56) References Cited

U.S. PATENT DOCUMENTS

| | | | | |
|---|---|---|---|---|
| 4,136,517 A | * | 1/1979 | Brown | F02C 9/28 60/223 |
| 4,948,339 A | * | 8/1990 | Adamson | B64C 11/30 416/145 |
| 8,365,583 B2 | | 2/2013 | Block et al. | |
| 8,370,100 B2 | | 2/2013 | Block et al. | |
| 9,169,742 B2 | | 10/2015 | Dooley et al. | |
| 2003/0077173 A1 | * | 4/2003 | Franchet | F04D 29/323 416/30 |
| 2014/0121934 A1 | | 5/2014 | Dooley | |
| 2015/0204208 A1 | * | 7/2015 | Bertolotti | F01D 21/003 415/1 |
| 2016/0258416 A1 | * | 9/2016 | Hammerum | F03D 7/0224 |
| 2016/0333730 A1 | * | 11/2016 | Duke | B64C 11/06 |
| 2017/0081038 A1 | * | 3/2017 | Looper | B64D 31/04 |
| 2017/0366302 A1 | | 12/2017 | Deschamps et al. | |
| 2018/0045071 A1 | | 2/2018 | Roach et al. | |

FOREIGN PATENT DOCUMENTS

CA 2970653 A1 * 12/2017 ............. B64D 45/00

* cited by examiner

*Primary Examiner* — Christopher Verdier
*Assistant Examiner* — Elton K Wong
(74) *Attorney, Agent, or Firm* — Norton Rose Fulbright Canada LLP (57) ABSTRACT

A method and system for operating a gas turbine engine coupled to an aircraft propeller are described herein. The method comprises detecting a command for unfeathering the propeller, inhibiting shaft shear detection logic in response to detecting the command for unfeathering the propeller, detecting completion of the unfeathering of the propeller, and enabling the shaft shear detection logic in response to detecting the completion of the propeller unfeathering.

14 Claims, 8 Drawing Sheets

SYSTEM AND METHOD FOR OPERATING A GAS TURBINE ENGINE COUPLED TO AN AIRCRAFT PROPELLER

TECHNICAL FIELD

The present disclosure relates generally to turboprop engines, and more particularly to avoiding false positives when detecting shaft shear events during propeller unfeather operation.

BACKGROUND OF THE ART

One of the techniques for detecting shaft shear events in gas turbine engines is to use a torque signature of the engine as part of a detection threshold. However, when a propeller is unfeathered, torque sometimes drops below a level used to detect the shaft shear event.

Therefore, improvements are needed.

SUMMARY

In accordance with a broad aspect, there is provided a method for operating a gas turbine engine coupled to an aircraft propeller. The method comprises detecting a command for unfeathering the propeller, inhibiting shaft shear detection logic in response to detecting the command for unfeathering the propeller, detecting completion of the unfeathering of the propeller, and enabling the shaft shear detection logic in response to detecting the completion of the propeller unfeathering.

In accordance with another broad aspect, there is provided a system for operating a gas turbine engine coupled to an aircraft propeller. The system comprises a processing unit and a non-transitory computer readable medium having stored thereon program instructions. The program instructions are executable by the processing unit for detecting a command for unfeathering the propeller, inhibiting shaft shear detection logic in response to detecting the command for unfeathering the propeller, detecting completion of the unfeathering of the propeller, and enabling the shaft shear detection logic in response to detecting the completion of the propeller unfeathering.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
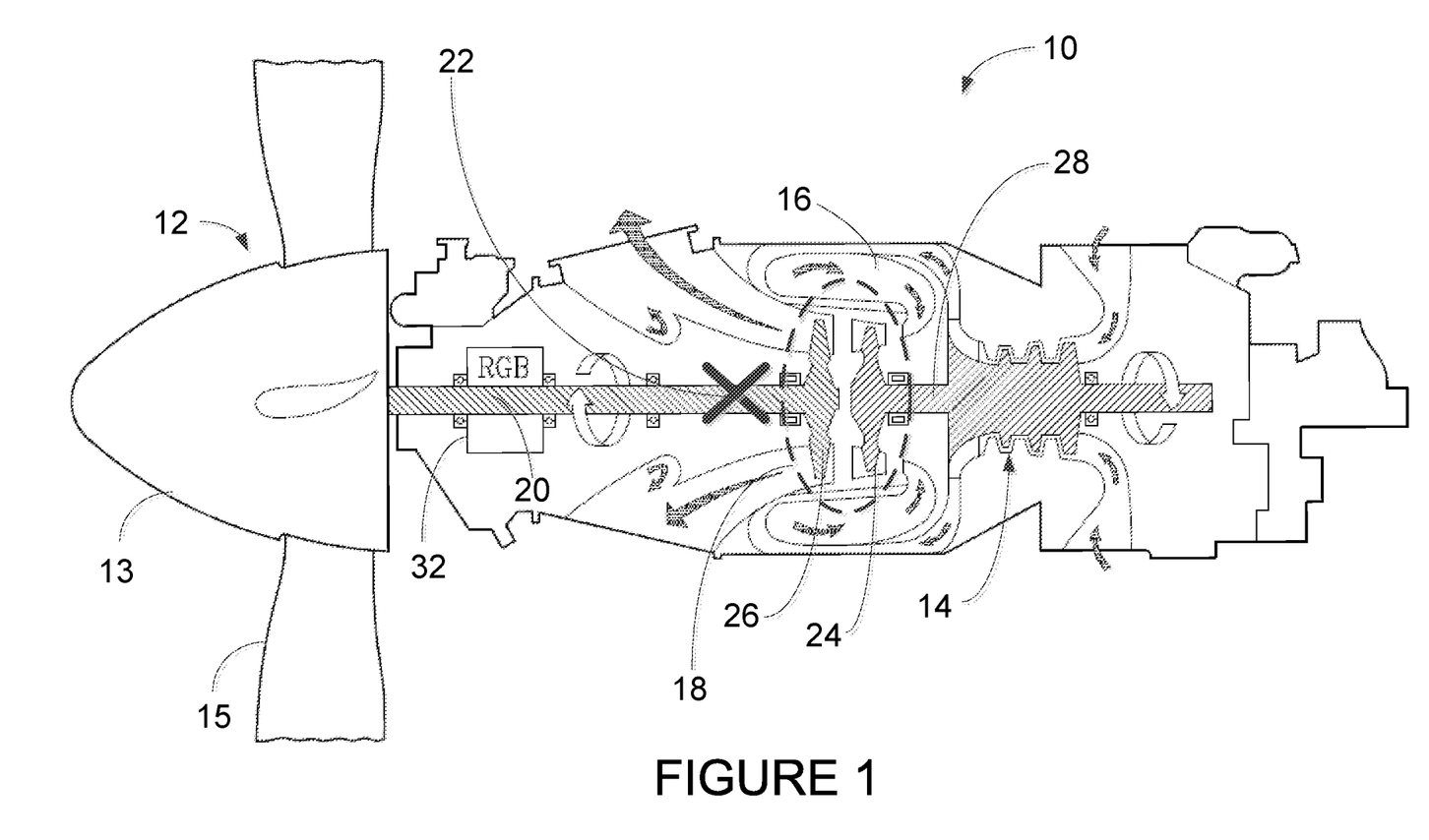
FIG. 1 is a schematic cross-sectional view of a gas turbine engine, in accordance with an illustrative embodiment.

There is described herein methods and systems for operating gas turbine engine coupled to a propeller. More particularly, methods and systems are provided for operating the engine when shaft shear detection logic is used to detect shaft shear events of the engine and/or propeller. The methods and systems described herein are used to avert spurious shaft shear accommodations during propeller unfeathering FIG. 1 illustrates a gas turbine engine 10 for which a shaft event, such as a shaft shear, a shaft decoupling, or any other type of shaft failure, may be detected using shaft shear detection logic. Engine 10 generally comprises in serial flow communication a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A low pressure spool is composed of a low pressure shaft 20 and a low pressure turbine 26. The low pressure shaft drives the propeller 12. A high pressure spool is composed of a high pressure turbine 24 attached to a high-pressure shaft 28, which is connected to the compressor section 14. A shaft event may occur and be detected at any point 22 along the low pressure shaft 20 between the low pressure turbine 26 and the propeller 12. The shaft event may occur on a portion of the shaft associated with the engine 10 or a portion of the shaft associated with the propeller 12. In an engine configuration having three spools, namely a low pressure spool, a high pressure spool, and a power turbine spool, a shaft event may occur and be detected at any point along a low pressure shaft of the low pressure spool or a power turbine shaft of the power turbine spool.

The engine 10 may be for an aircraft or another type of vehicle. The engine 10 may also be for industrial use and/or marine use, such as in a boat or other naval application. The propeller 12 may be for a fixed-wing aircraft or a main (or tail) rotor of a rotary wing aircraft such as a helicopter. The propeller 12 comprises a hub 13 and one or more blades 15 extending radially from the hub 13. The blades 15 are each rotatable about their own radial axes through a plurality of blade angles, which can be changed to achieve modes of operation, such as feather, full reverse, and forward thrust. The blade angle (also referred to herein as blade pitch) of the propeller 12, may be controlled by a propeller controller.

As referred to herein, adjusting the blade pitch to "feather" the propeller 12 refers to directing the blades 15 of the propeller 12 to the feather position. In the feather position, the blade pitch is positioned where a maximum rotational drag and a minimum forward drag exists. Controlling the propeller blade pitch to the feather position may be performed, for example, following an engine start, preceding a shutdown of the engine on ground or in flight, and/or on a failed engine during the take-off phase. Reference to "unfeather" or "unfeathering" of the propeller 12 refers to directing the blades 15 of the propeller 12 out of the feathering position, such that the blades 15 go from a blade pitch that is "coarse", i.e. approximately parallel to airflow (i.e. with a low forward drag and a high torque) to a "fine" blade pitch where the blades 15 take a bite out of surrounding air (i.e. increased power absorption by propellers, and decreased torque).

Figure 2:
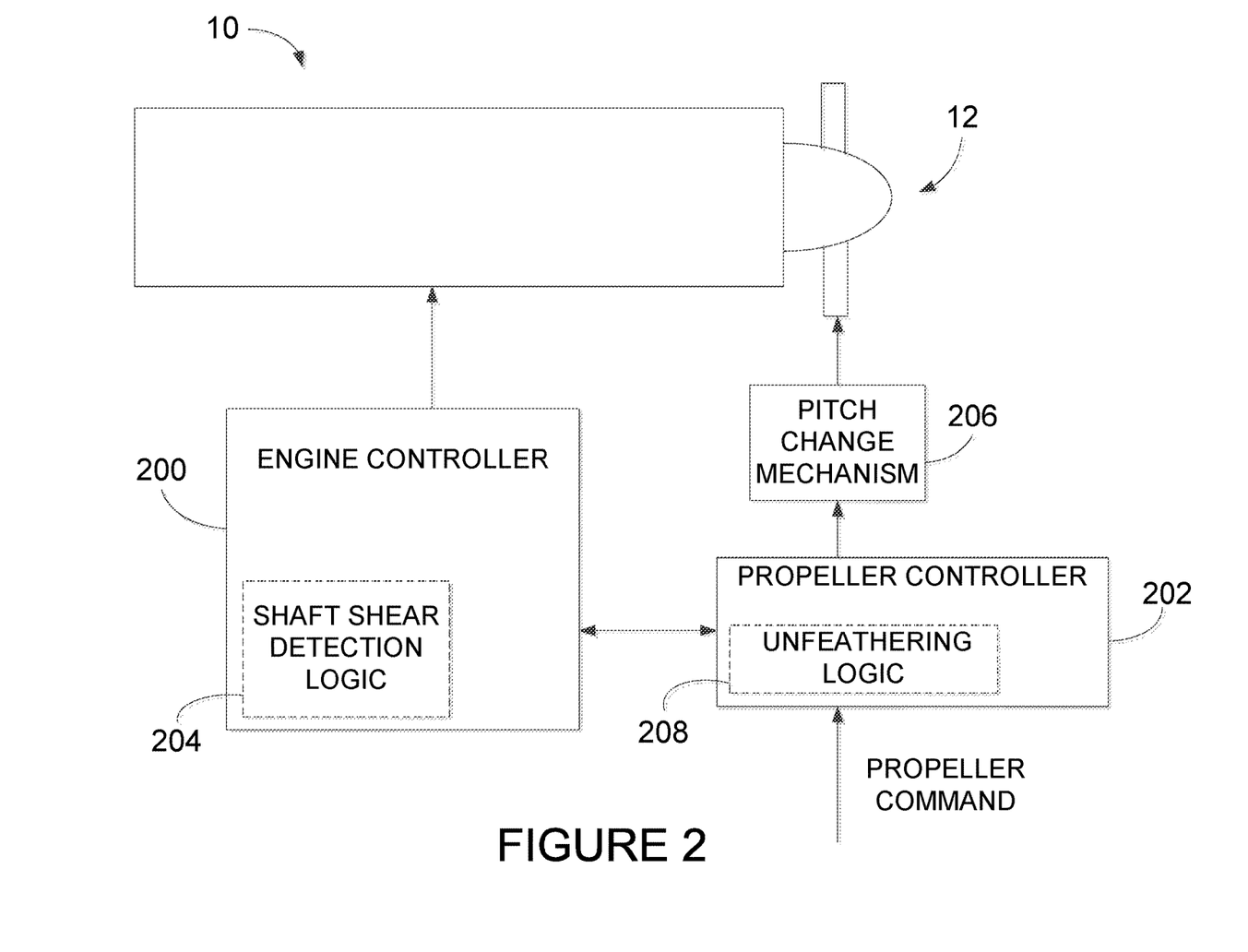
FIG. 2 is a schematic illustrates of the gas turbine engine of FIG. 1 and its control systems, in accordance with an illustrative embodiment.

Referring now to FIG. 2, there is illustrated an example embodiment of the various control systems for controlling the engine 10 and the propeller 12. An engine controller 200 is operatively connected to the engine 10. Various sensors provide measurements to the engine controller 200, and the engine controller 200 responds by adjusting a series of actuators and valves. For example, engine rotation per minute (RPM) is monitored by a crankshaft position sensor or another type of sensor, and the engine controller 200 is configured to open and close one or more fuel valves to add or remove engine fuel in response to the measured RPM, as a function of a requested engine speed. Other sensors and control functions of the engine controller 200 will be readily understood by those skilled in the art.

A propeller controller 202 is coupled to a pitch change mechanism 206 for controlling the angle of the blades 15 of the propeller 12. The propeller controller 202 responds to a change in a requested propeller speed and/or another propeller command with a change in blade angle. The propeller controller 202 senses propeller speed and instructs the pitch change mechanism 206 to change the blade angle to adjust the torque absorption and therefore the propeller speed.

The propeller controller 202 and the engine controller 200 are communicatively connected so as to exchange information, such as various sensor measurements and other engine and/or propeller data. While illustrated as separate, the engine controller 200 and propeller controller 202 may be provided as a single, combined unit.

In some embodiments, shaft shear detection logic 204 is provided on the engine controller. The shaft shear detection logic 204 may alternatively be provided on the propeller controller 202, or separately from both the engine controller 200 and the propeller controller 202. The shaft shear detection logic 204 is configured for detecting a shaft event, such as a shaft shear, a shaft decoupling, and/or a shaft failure of a gas turbine engine such as engine 10. In some embodiments, the shaft shear detection logic 204 uses engine torque or propeller torque as one of the conditions for detecting the shaft event. For example, in some embodiments, the shaft shear detection logic is configured in accordance with the methods and systems described in U.S. Patent Application Publication No. 2018/0045071, the contents of which are hereby incorporated by reference. As such, a torque detection threshold is used as part of the shaft shear detection logic. When a shaft shear event is detected, various accommodations may be provided, such as shutting down the engine or reducing the engine fuel flow.

In accordance with the embodiments described herein, unfeathering logic 208 is provided to avoid spurious accommodations from the shaft shear detection logic 204 during propeller unfeathering, which may occur when the torque drops below the torque detection threshold during a propeller unfeathering procedure. Although illustrated as part of the propeller controller 202, the unfeathering logic 208 may also be provided in the engine controller 200, or separately from both the engine controller 200 and the propeller controller 202. In some embodiments, the unfeathering logic 208 is provided as part of the shaft shear detection logic 204.

Figure 3:
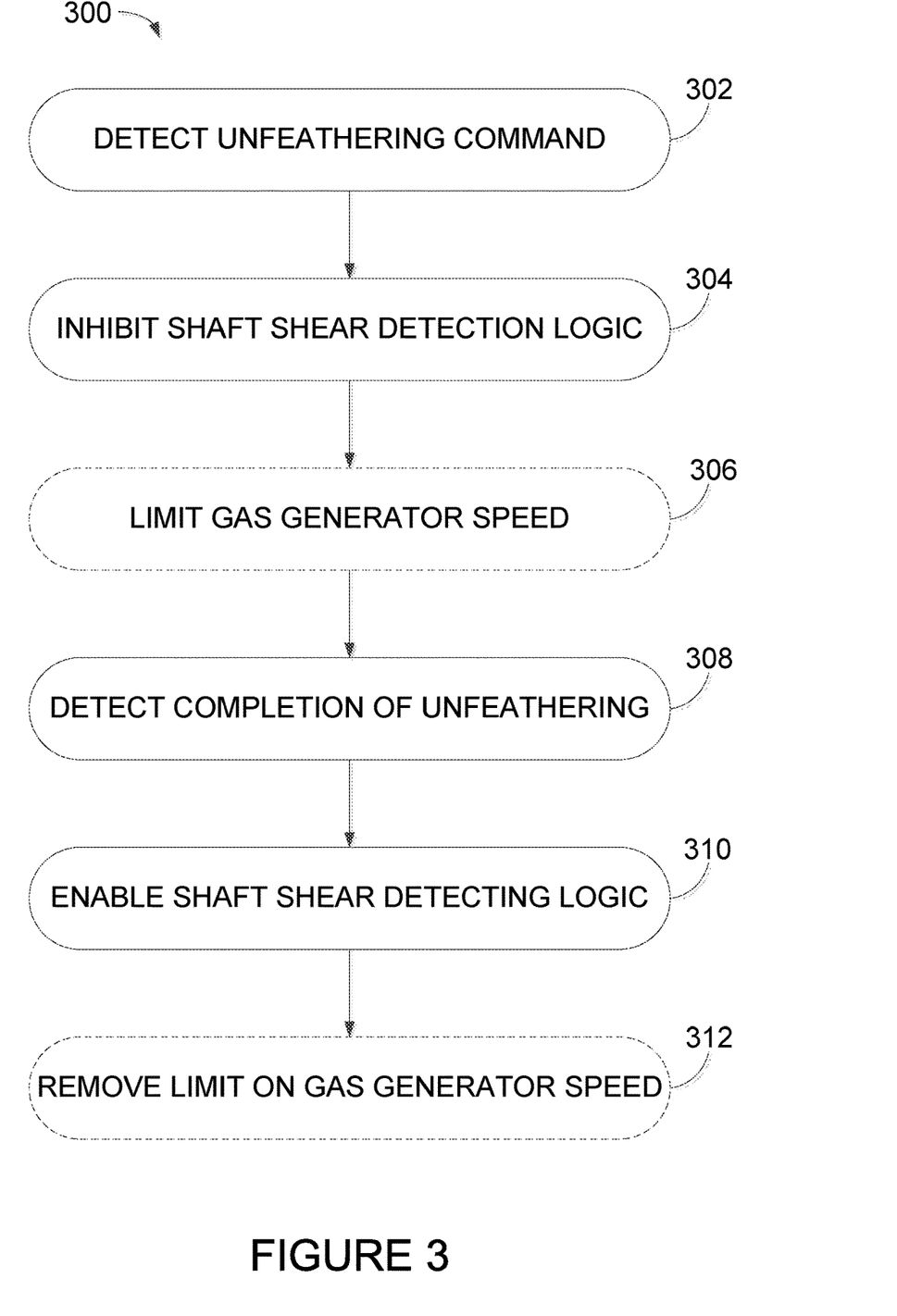
FIG. 3 is a flowchart of a method for operating a propeller, in accordance with an illustrative embodiment.

Referring to FIG. 3, there is illustrated an example method 300 embodying the unfeathering logic 208, as performed by the engine controller 200, the propeller controller 202, or another computing device configured for performing the steps of the method 300. At step 302, an unfeathering command of the propeller is detected. In some embodiments, an unfeathering command is received from a cockpit or flight deck of the aircraft, as an on/off input from a pilot or another aircraft operator. The unfeathering command may be received directly at the propeller controller 202, or via the engine controller 200 or an aircraft controller (not shown).

At step 304, the shaft shear detection logic 204 is inhibited in response to detecting the command for unfeathering the propeller 12. In some embodiments, inhibiting the shaft shear detection logic 204 refers to disabling the logic 204, to prevent any detection of a shaft shear event. In some embodiments, inhibiting the shaft shear detection logic 204 refers to pausing the logic 204, for example in a case where the shaft shear detection logic 204 is a script that runs in a loop at all times while the engine 10 is running. In some embodiments, inhibiting the shaft shear detection logic 204 refers to lowering the torque detection threshold, or another threshold, used as part of the detection logic 204. Other manners in which the shaft shear detection logic 204 may be inhibited will be readily understood by those skilled in the art. An inhibition command may be sent from the unfeathering logic 208 to the shaft shear detection logic 204. The inhibition command may be transmitted from the propeller controller 202 to the engine controller 200 via a wired or wireless connection. In some embodiments, the inhibition command is sent using the Aeronautical Radio INC. (ARINC) technical standard via an avionics data bus. Other data transfer standards may also be used.

In some embodiments, the method 300 comprises a step 306 of limiting a gas generator speed of the gas turbine engine, such as engine 10. A speed limit may be predetermined and selected as a "safe" speed for the engine 10 to run without the shaft shear detection logic 204. This may be done in order to minimize the risks associated with inhibiting the shaft shear detection logic 204 during the propeller unfeathering procedure. Alternatively, method 300 is performed without step 306. Note that step 306 may occur concurrently with step 304, or before step 304, in accordance with some embodiments.

At step 308, completion of the unfeathering of the propeller is detected by the unfeathering logic 208. At step 310, the shaft shear detection logic 204 is enabled in response to detecting the completion of the unfeathering procedure. In this context, "enabled" should be understood to refer to reversing or terminating any type of inhibiting performed at step 304. Enabling of the shaft shear detection logic 204 may come in the form of a command transmitted from the unfeathering logic 208 to the shaft shear detection logic 204, either through the propeller controller 202 and the engine controller 200, respectively, or independently therefrom.

If method 300 is performed with step 306 of limiting the gas generator speed 306 while the shaft shear detection logic 204 is inhibited, step 312 of removing the limit on the gas generator speed may be performed subsequently to or concurrently with step 310 of enabling the shaft shear detection logic 310 in response to detecting the completion of the propeller unfeathering 308.

Various techniques may be used to confirm completion of the unfeathering procedure, as per step 308. Upon receipt of an unfeather command, at least one condition is used to detect completion of the unfeathering. In some embodiments, detecting completion of the unfeathering procedure is performed using the blade angle or blade pitch of the propeller 12. When the blade angle reaches a predetermined blade angle threshold, the unfeathering logic confirms completion of the unfeathering procedure at step 308 and the method 300 moves on to step 310.

In some embodiments, a time threshold is used to confirm completion of the unfeathering procedure. For example, a timer is started when the unfeathering command is received and completion of the unfeathering procedure is detected when the timer reaches a time threshold.

Figure 4:
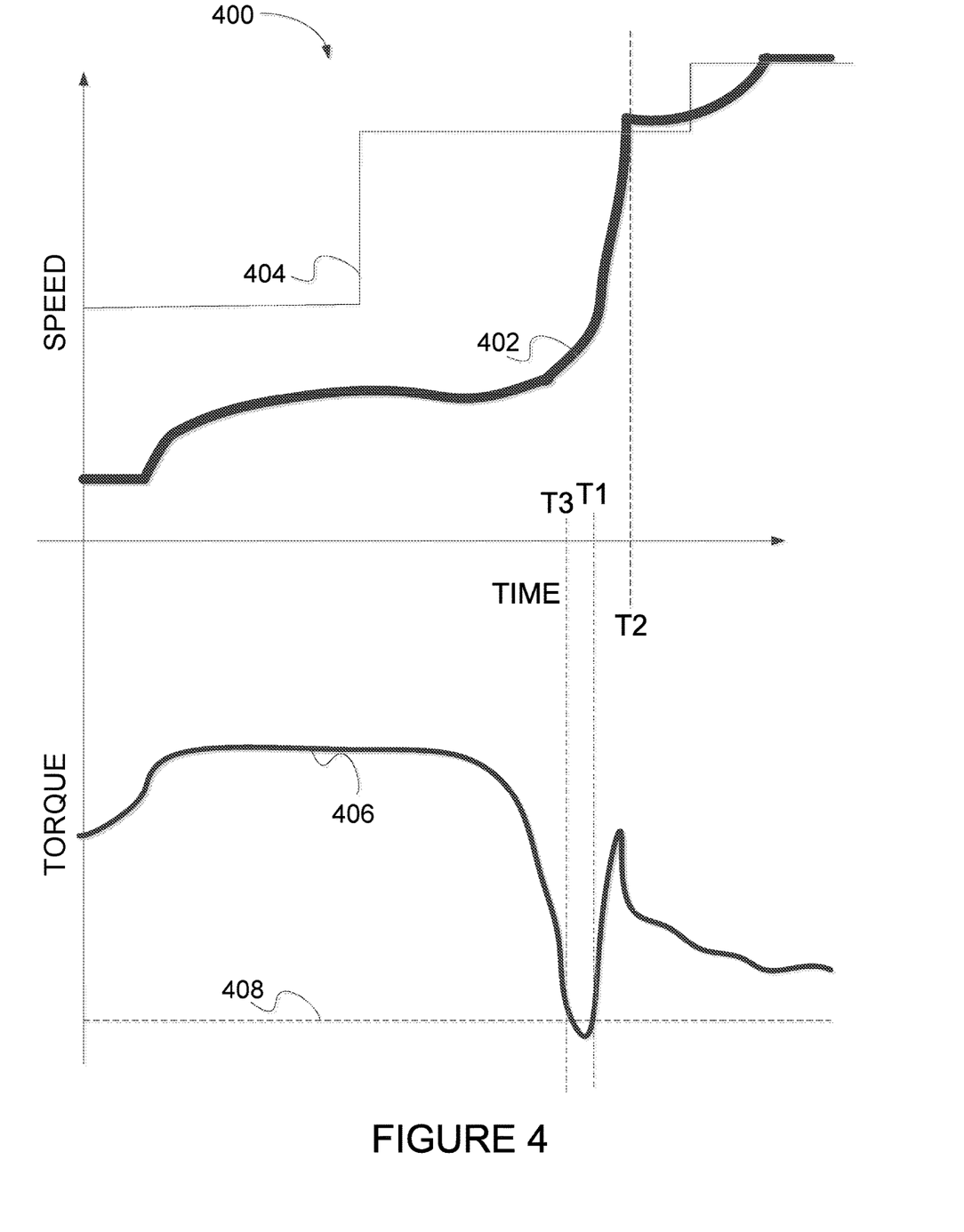
FIG. 4 is a graph illustrating two conditions for detecting completion of a propeller unfeathering procedure, in accordance with a first illustrative embodiment.

In some embodiments, two or more conditions are used to confirm completion of the unfeathering procedure. Referring to FIG. 4, there is illustrated a graph 400 representing an embodiment of detecting completion of propeller unfeathering using two conditions. The top portion of the graph 400 represents speed of the propeller over time. Curve 402 is the actual propeller speed, curve 404 is the requested or commanded propeller speed. The first condition corresponds to actual propeller speed 402 being greater than or equal to the requested propeller speed 404. The requested propeller speed 404 is thus used as a speed threshold for the first condition to be met. As shown in the example of graph 400, this occurs at time T2.

The bottom portion of the graph 400 illustrates propeller torque over time. Curve 406 represents the actual propeller torque, curve 408 represents a shaft shear detection threshold. The second condition corresponds to propeller torque 406 being above a minimum threshold, such as the shaft shear detection threshold 408. The second condition occurs at time T1, which precedes time T2. Therefore, in this embodiment, completion of the propeller unfeathering procedure would only be detected at time T2 when both the first condition and the second condition are met.

In some embodiments, the speed threshold for the first condition corresponds to requested propeller speed+/−a delta value to account for accuracy of the propeller to meet the requested speed. The delta value may be determined from the specifications of the propeller, as a function of the propeller design.

Note that the second condition, corresponding to propeller torque, is also met any time before time T3. However, the condition is no longer met between time T3 and time T1. Should the first condition be met between times T3 and T1, then completion would be detected at time T1. In some embodiments, the speed threshold used for the first condition is set to a value known to be attained by the propeller only after the propeller torque has dipped below the shear detection threshold, in order to avoid a situation where both the first condition and the second condition are met before time T3 and a false detection of propeller unfeathering occurs.

Figure 5:
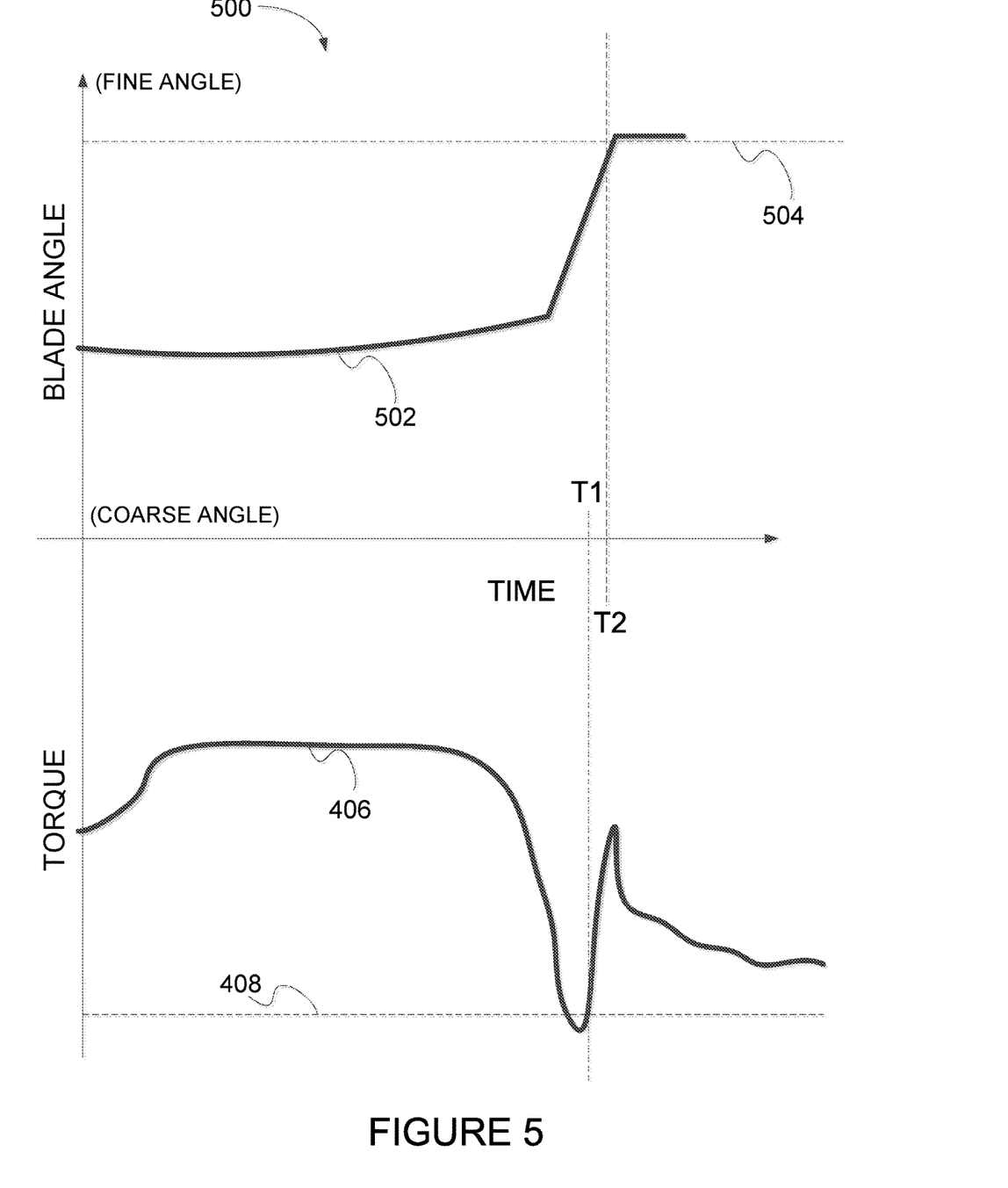
FIG. 5 is a graph illustrating two conditions for detecting completion of a propeller unfeathering procedure, in accordance with a second illustrative embodiment.

FIG. 5 is a graph 500 of another exemplary embodiment of detecting completion of the unfeathering procedure using two conditions. In this example, the first condition is replaced by the blade angle of the propeller 12. Curve 502 represents the blade angle of the propeller, curve 504 represents an angle threshold. The first condition is met at time T2, when the blade angle reaches the angle threshold. The blade angle of the propeller transitions to a coarser (or higher) angle, from a fine (or low) angle once commanded speed is attained. The second condition remains the propeller torque, and is met at time T1 which occurs before time T2. In this embodiment, both conditions are met at time T2, which is when completion of the unfeathering procedure is detected.

Figure 6:
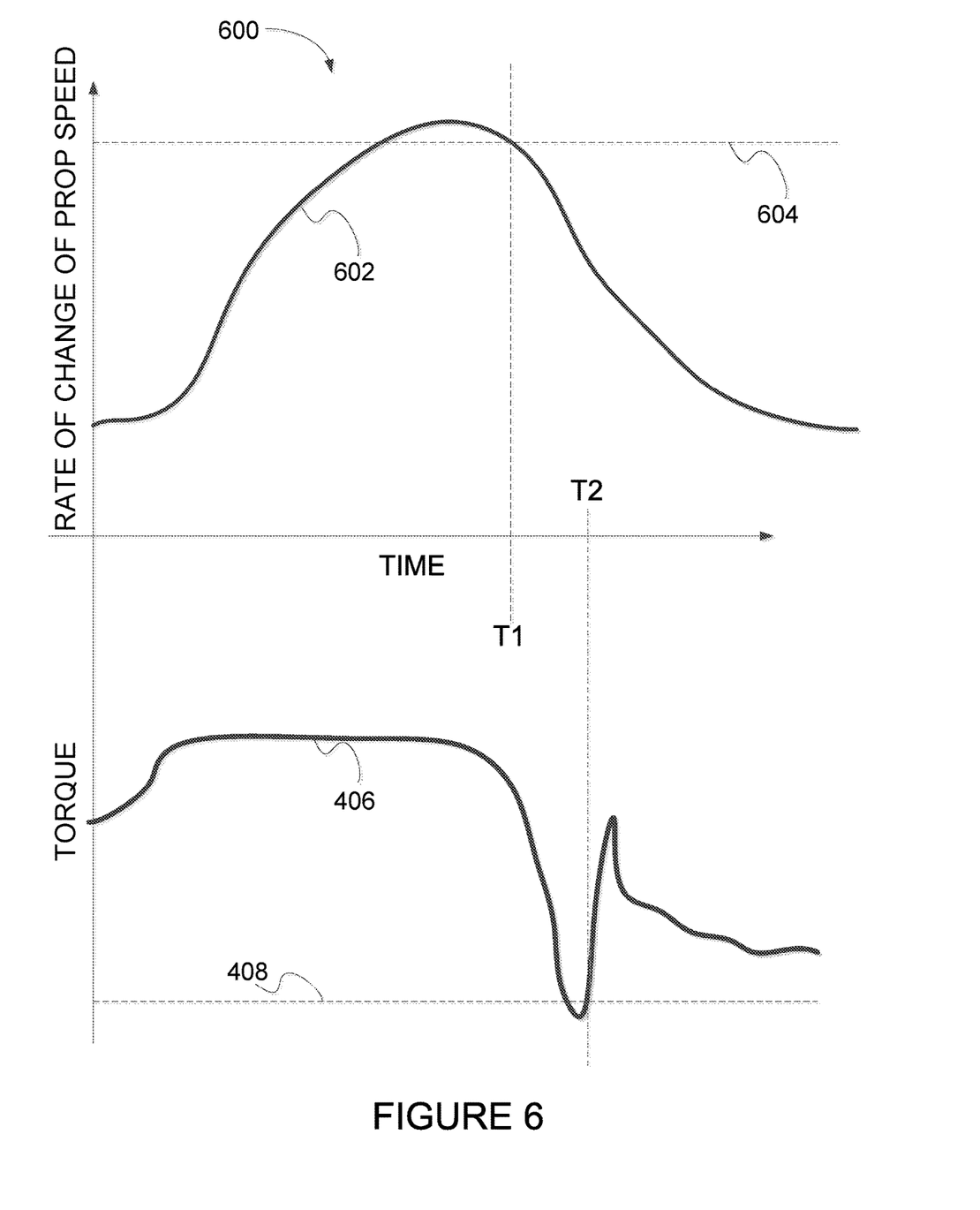
FIG. 6 is a graph illustrating two conditions for detecting completion of a propeller unfeathering procedure, in accordance with a third illustrative embodiment.
Figure 7:
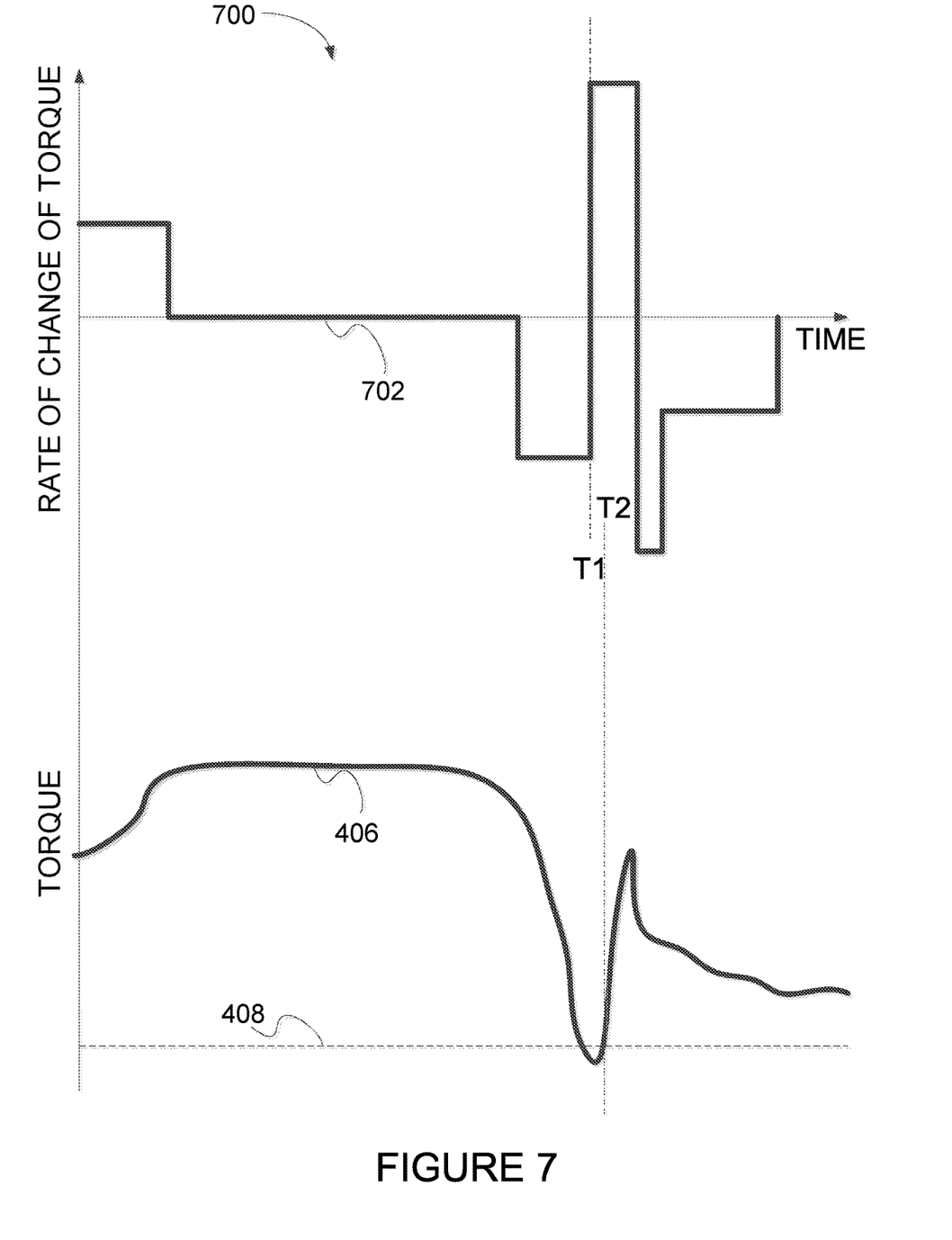
FIG. 7 is a graph illustrating two conditions for detecting completion of a propeller unfeathering procedure, in accordance with a fourth illustrative embodiment.

FIG. 6 is a graph 600 of another exemplary embodiment of detecting completion of the unfeathering procedure using two conditions. In this example, the first condition is replaced by the rate of change of the propeller speed (i.e. NP-dot). Curve 602 represents the rate of change of the propeller speed, curve 604 represents a rate of change threshold. The first condition is met at time T1, when the rate of change of the propeller speed 602 crosses the rate of change threshold 604 in a downwards direction. The rate of change of the propeller speed is expected to decrease as the propeller unfeathering sequence is completed. The second condition remains the propeller torque, and is met at time T2 which occurs after time T1. In this embodiment, both conditions are met at time T2, which is when completion of the unfeathering procedure is detected FIG. 7 is a graph 700 of yet another exemplary embodiment of detecting completion of the unfeathering procedure using two conditions. In this example, the first condition is replaced by the rate of change of propeller torque (i.e. Q-dot). Curve 702 represents the rate of change of the propeller torque. The first condition is met when the rate of change of the propeller torque 702 transitions from negative to positive by crossing the horizontal axis of the graph 700. The first condition is met at time T1. The second condition remains the propeller torque, and is met at time T2 which occurs after time T1. In this embodiment, both conditions are met at time T2, which is when completion of the unfeathering procedure is detected.

In some embodiments, such as those illustrated in FIGS. 4 to 7, a timer is used instead of the torque threshold as the second condition. For example, a timer set to 45 seconds is started when the unfeathering command is received, and the second condition is met when the timer reaches 45 seconds. When the first condition is also met, completion of the unfeathering procedure is detected. Note that 45 seconds is only used as an arbitrary value to illustrate the notion. Other values may also apply.

It should be understood that various embodiments may be used to detect completion of the unfeathering procedure. In some embodiments, the second condition relating to torque is used to enable the shaft shear detection logic once unfeathering is completed and thus, only the first condition is used to detect completion of the unfeathering. In addition, detecting completion of the unfeathering procedure may be used for applications other than inhibiting the shaft shear detection logic, where a minimum torque is not required. As such, any one of the examples used for the first condition in FIGS. 4 to 7 may be used on their own, without being supplemented by a second condition.

The unfeathering logic 208 may be implemented in various manners, such as in software on a processor, on a programmable chip, on an Application Specific Integrated Chip (ASIC), or as a hardware circuit. In some embodiments, the unfeathering logic 208 is implemented in hardware on a dedicated circuit board located inside an Electronic Engine Controller (EEC) or an Engine Control Unit (ECU). The EEC or ECU may be provided as part of a Full Authority Digital Engine Control (FADEC) of an aircraft. In some cases, a processor may be used to communicate information to the circuit. In other embodiments, the unfeathering logic 208 is implemented in a digital processor.

Figure 8:
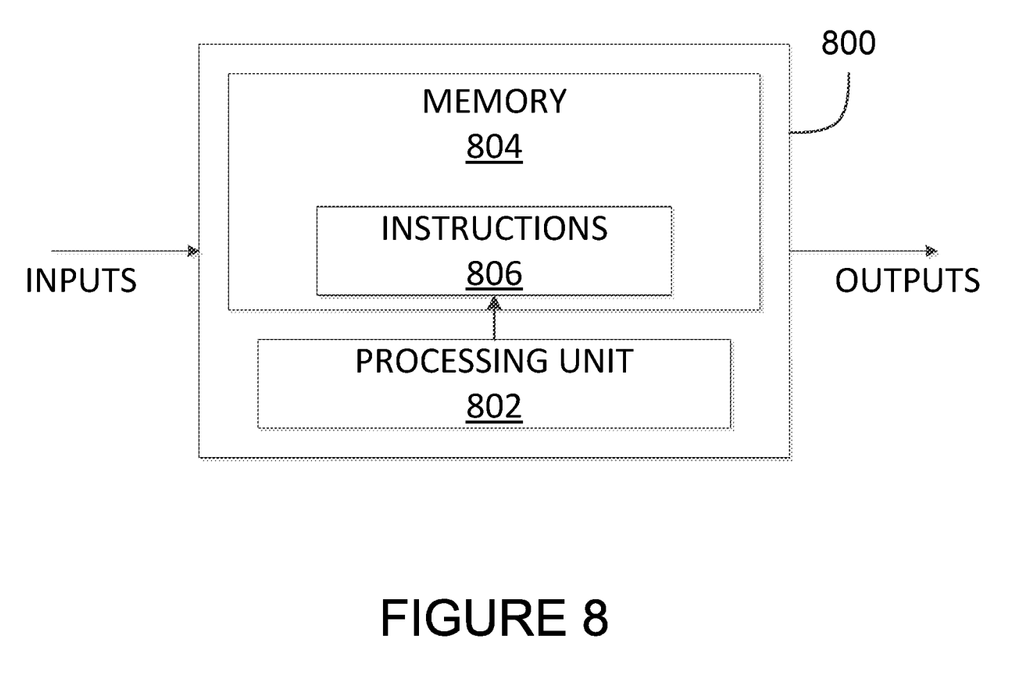
FIG. 8 is a block diagram of an computing device for performing the method of FIG. 3, in accordance with an illustrative embodiment.

An example embodiment of a computing system 800 for implementing the unfeathering logic 208 is illustrated in FIG. 8. The computing device 800 may comprise, amongst other things, a processing unit 802 and a memory 804 which has stored therein computer-executable instructions 806. The processing unit 802 may comprise any suitable devices configured to cause a series of steps to be performed so as to implement the method 300 such that instructions 806, when executed by the computing device 800 or other programmable apparatus, may cause the functions/acts/steps specified in the methods described herein to be executed. The processing unit 802 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 804 may comprise any suitable machine-readable storage medium. The memory 804 may comprise non-transitory computer readable storage medium such as, for example, but not limited to, an electronic, magnetic, optical, electromagnetic, infrared, or semiconductor system, apparatus, or device, or any suitable combination of the foregoing. The memory 804 may include a suitable combination of any type of computer memory that is located either internally or externally to device 800, such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

The unfeathering logic 208 described herein may be implemented in a high level procedural or object oriented programming or scripting language, or a combination thereof, to communicate with or assist in the operation of a computer system, for example the computing device 800. Alternatively, the unfeathering logic 208 may be implemented in assembly or machine language. The language may be a compiled or interpreted language. Program code for implementing the unfeathering logic 208 may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the unfeathering logic 208 may also be considered to be implemented by way of a non-transitory computer-readable storage medium having a computer program stored thereon. The computer program may comprise computer-readable instructions which cause a computer, or more specifically the processing unit 802 of the computing device 800, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

Various aspects of the methods and systems for detecting the shaft event may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for operating a gas turbine engine coupled to an aircraft propeller, the method comprising:
   detecting a command for unfeathering the propeller;
   inhibiting shaft shear detection logic in response to detecting the command for unfeathering the propeller;
   applying a limit to a gas generator speed of the gas turbine engine while the shaft shear detection logic is inhibited;
   detecting completion of the unfeathering of the propeller; and
   enabling the shaft shear detection logic and removing the limit from the gas generator speed of the gas turbine engine in response to detecting the completion of the propeller unfeathering.

2. The method of claim 1, wherein detecting completion of the unfeathering of the propeller comprises determining that a time threshold has been exceeded.

3. The method of claim 1, wherein detecting completion of the unfeathering of the propeller comprises determining that a rotational speed of the propeller has reached a speed threshold, and one of:
   (a) determining that a torque of the propeller is above a shaft shear detection threshold; and
   (b) determining that a time threshold has been exceeded.

4. The method of claim 3, wherein the speed threshold is a requested speed minus a delta value.

5. The method of claim 1, wherein detecting completion of the unfeathering of the propeller comprises determining that a blade angle of the propeller has reached an angle threshold, and one of:
   (a) determining that a torque of the propeller is above a shaft shear detection threshold; and
   (b) determining that a time threshold has been exceeded.

6. The method of claim 1, wherein detecting completion of the unfeathering of the propeller comprises determining that a rate of change of a speed of the propeller falls below a rate of change threshold, and one of:
   (a) determining that a torque of the propeller is above a shaft shear detection threshold; and
   (b) determining that a time threshold has been exceeded.

7. The method of claim 1, wherein detecting completion of the unfeathering of the propeller comprises determining that a rate of change of a torque of the propeller has transitioned from negative to positive, and one of:
   (a) determining that the torque of the propeller is above a shaft shear detection threshold; and
   (b) determining that a time threshold has been exceeded.

8. A system for operating a gas turbine engine coupled to an aircraft propeller, the system comprising:
   a processing unit; and
   a non-transitory computer readable medium having stored thereon program instructions executable by the processing unit for:
   detecting a command for unfeathering the propeller;
   inhibiting shaft shear detection logic in response to detecting the command for unfeathering the propeller;
   applying a limit to a gas generator speed of the gas turbine engine while the shaft shear detection logic is inhibited;
   detecting completion of the unfeathering of the propeller; and enabling the shaft shear detection logic and removing the limit from the gas generator speed of the gas turbine engine in response to detecting the completion of the propeller unfeathering.

9. The system of claim 8, wherein detecting completion of the unfeathering of the propeller comprises determining that a time threshold has been exceeded.

10. The system of claim 8, wherein detecting completion of the unfeathering of the propeller comprises determining that a rotational speed of the propeller has reached a speed threshold, and one of:
   (a) determining that a torque of the propeller is above a shaft shear detection threshold; and
   (b) determining that a time threshold has been exceeded.

11. The system of claim 10, wherein the speed threshold is a requested speed minus a delta value.

12. The system of claim 8, wherein detecting completion of the unfeathering of the propeller comprises determining that a beta angle of a blade of the propeller has reached an angle threshold, and one of:
   (a) determining that a torque of the propeller is above a shaft shear detection threshold; and
   (b) determining that a time threshold has been exceeded.

13. The system of claim 8, wherein detecting completion of the unfeathering of the propeller comprises determining that a rate of change of a speed of the propeller falls below a rate of change threshold, and one of:
   (a) determining that a torque of the propeller is above a shaft shear detection threshold; and
   (b) determining that a time threshold has been exceeded.

14. The system of claim 8, wherein detecting completion of the unfeathering of the propeller comprises determining that a rate of change of a torque of the propeller has transitioned from negative to positive, and one of:
   (a) determining that the torque of the propeller is above a shaft shear detection threshold; and
   (b) determining that a time threshold has been exceeded.

* * * * *